Dec. 19, 1967     R. PERRY     3,359,406
ELECTRONIC COUNTER

Filed June 9, 1964     6 Sheets-Sheet 1

INVENTOR.
RUSSELL PERRY
BY
Leonard H. King
ATTORNEY

INVENTOR.
RUSSELL PERRY
BY
Leonard H. King
ATTORNEY

Dec. 19, 1967  R. PERRY  3,359,406
ELECTRONIC COUNTER
Filed June 9, 1964  6 Sheets-Sheet 3

INVENTOR.
RUSSELL PERRY
BY
Leonard H. King
ATTORNEY

Dec. 19, 1967      R. PERRY      3,359,406
ELECTRONIC COUNTER Filed June 9, 1964      6 Sheets-Sheet 6

INVENTOR.
RUSSELL PERRY

BY *Leonard H. King*

ATTORNEY

United States Patent Office 3,359,406
Patented Dec. 19, 1967

3,359,406
ELECTRONIC COUNTER
Russell Perry, Smithtown, N.Y., assignor to General Time
Corporation, Stamford, Conn.
Filed June 9, 1964, Ser. No. 373,726
8 Claims. (Cl. 235—92)

This invention relates to electronic counters, and in particular but not limited to electronic preset counters.

A preset counter differs from the ordinary type of counter in that an output signal is supplied or an action takes place by the preset counter when the count reaches the preset level. In the dual preset type of counter, for example, one preset action takes place after a predetermined number of counts and a subsequent action takes place when the second count is reached. The present invention is not limited to dual presets; as many presets may be utilized as required.

Preset counters are applicable to automatic data-reduction systems, liquid flow and level measurement systems and other process control systems utilizing periodic measurements and similar counting functions. As another example of usage, a preset counter is an ideal actuating device when a material is to be measured, then cut to a specific length. A footage pickup may be mounted to produce one input pulse to the counter for a given length of feed. At some predetermined point prior to cutoff it may be necessary to slow the feed or accelerate the cutoff mechanism; this can be readily done upon signal from the first preset counter, whereupon, the actual cutoff can be initiated by the second preset. Other uses are in the automation of machine tools where a suitable device converts revolutions of a feedscrew into counter pulses. The presets can then be used to slow, stop, or reverse the feed as required.

In the present invention standard vertical numerical displays are used, affording excellent readability and eliminating the ambiguity and reading errors associated with the circular glow-tube type of display used in some counters in the prior art. Other counters in the prior art are usable only with number systems employing an even quantity of numbers. The present invention is usable without circuit modification to any system of numbers to whatever base, i.e., binary, octal, decimal, quinary, etc.

It is therefore an object of the present invention to provide an electronic counter comprising a plurality of identical modules which are conveniently connected together without the necessity of external wiring.

It is a further object of the invention to provide a power supply module which furnishes all required operating voltages for the plurality of counter modules, and which connects to the counter modules by a simple plug-together means requiring external wiring only for connecting to the A.C. power mains.

Another object of the invention is to provide counter modules which incorporate preset circuitry furnishing one or more outputs from the counter modules which can actuate external equipment at any chosen count.

Another object of the invention is to provide a simple electronic counter capable of counting to as many digits as required.

A further object is to provide an improved electronic counter capable of counting to any system of numbers such as binary, octal, decimal, quinary, etc.

An object of the invention is to provide an improved electronic counter which is capable of reliable operation at counting rates as high as 1000 counts per second.

It is another object of the present invention to provide an improved electronic counter which may be reset to zero by electronic means at a location remote from the counter itself.

Another object of the invention is to provide a simple improved counter utilizing a columnar direct reading display.

These and other features, objects and advantages of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

Figure 1:
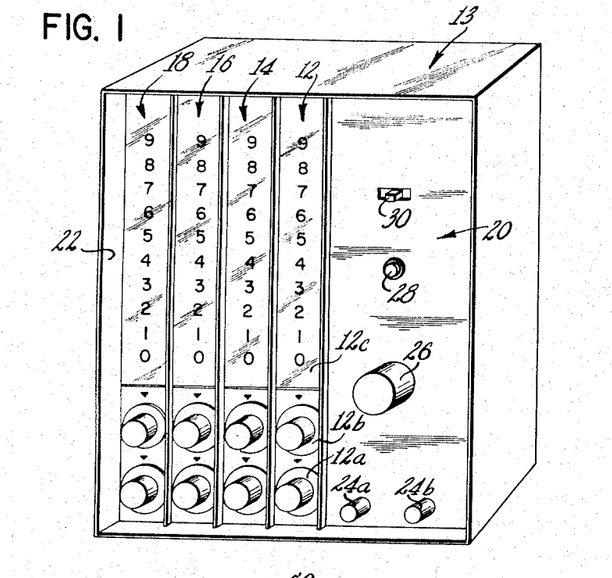
FIG. 1 is a pictorial view of the assembled counter modules together with the power supply module and the housing.

FIG. 1 illustrates a four-stage counter comprising four identical counter modules 12, 14, 16 and 18 corresponding to units, tens, hundreds, and thousands, respectively. These, and power supply module 20 are housed in dust cover or case 22. On the front panel of each of the counter modules are preset selector switch knobs 12a and 12b, 14a and 14b, etc., for dual presets. Counter modules having only one preset employ only one preset knob, such as 12a, for each counter module. In the typical decade counter illustrated, each of the modules employs a scale having 10 numbers arranged in a vertical display starting with 0 at the bottom and ending with 9 at the top. The scale plate 12c is opaque while the numerals are clear.

Figure 3:
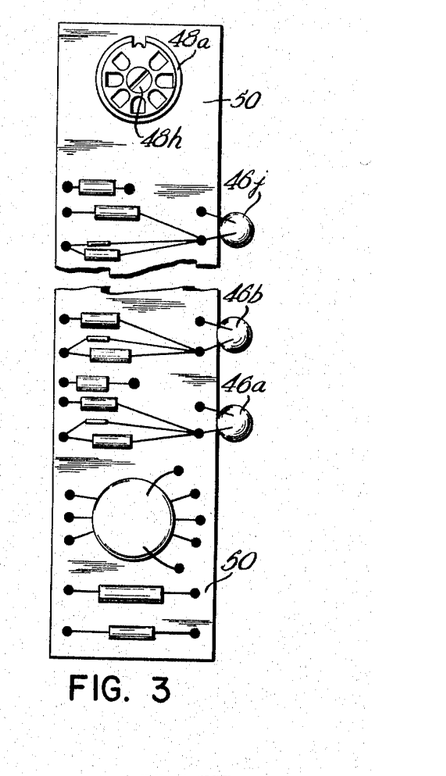
FIG. 3 is a plan view of the component board removed from a counter module.

A vertical row of neon lamps 46a–46j (FIG. 3A) is mounted directly behind the vertical row of numbers of scale plate 12c. The count is clearly visible as a numeral which appears in the normal neon-lamp color against an opaque background. Black is a suitable color for the background.

Power supply 20 furnishes the required operating voltages for the complete counter 13. Except for the preset switch knobs (such as 12a, 12b, etc.) the counter operating controls are mounted on the front panel of the power supply. A complete description of the power supply, together with the schematic diagram follows the general circuit description of the counter provided hereinafter.

Figure 2A:
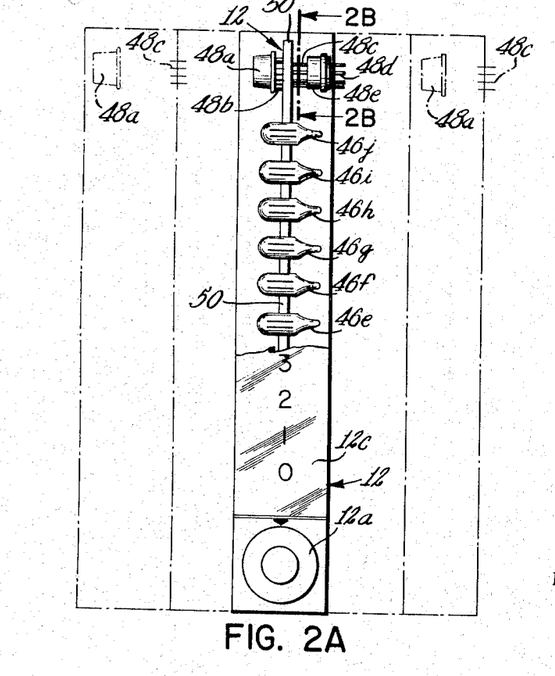
FIG. 2A is a cutaway view of a counter module.

FIG. 2 shows a typical counter module 12 partially cut away. Female socket 48a connects the next higher decade, while male plug 48d mates with a socket in the preceding counter module or connects the units module to the matching power supply module 20 (FIG. 1). The component board 50 of FIG. 2A is shown in plan view of FIG. 3. The row of neon lamps such as 46a through 46j is placed at a right angle with respect to the edge of board 50, and spaced so that each lamp will be centered directly behind the applicable numeral on the counter scale plate 12c (FIG. 1).

Each of the counter modules is identical and therefore can operate equally well in any location in the multimodule counter, such as units, tens, hundreds, etc.

Figure 2B:
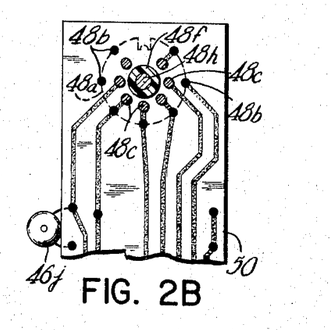
FIG. 2B is a fragmentary view of the module interconnecting means.

A feature of the present invention is the manner of interconnecting the various counter modules and the power supply module to form in coordinated counter assembly, as shown in FIG. 1. At the right side of each counter module (as viewed from the front with the digital display reading upward from digit 0) is a connector having male pins 48d (see FIG. 2A) arranged in a manner similar to that of a multipin tube base. At the left side of the counter module on the same axis as the male connector 48e is located a flush-mounted multisocket female connector 48a having sockets oriented so as to mate with the pins 48d of connector 48e on the right side of the adjacent counter module. Interposed between the female connector 48a and the projecting male connector 48e is an insulated cylindrical internally threaded stud or rod 48f (FIG. 2B) which, together with screw 48h through socket 48a, provides a means of securing both connectors 48a and 48e to component board 50 (FIG. 2A). Connections common to all counter modules, such as +B supply, signal ground, and reset circuit return, are made by connecting the applicable socket strap or leadwire 48b to the desired pin 48c of the male connector 48e. Lead-wire 48c is an axial extension of pin 48d. Where the circuitry does not feed through from one module to another, the socket leadwire or strap 48b is left unconnected at board 50 (FIG. 2B). This feature provides a means of making connections between counter modules and between counter module and power supply module without use of external leads.

Figure 4:
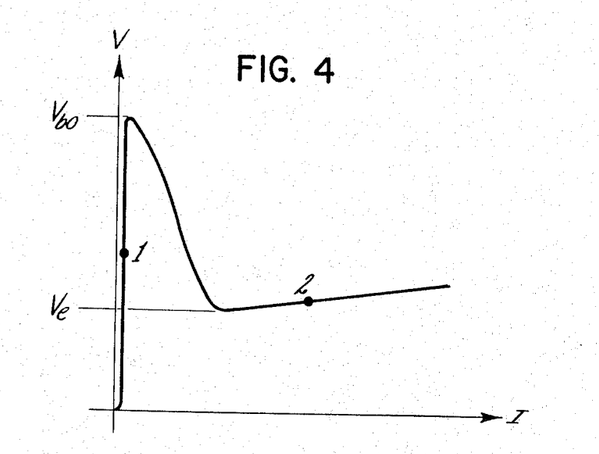
FIG. 4 is a characteristic curve for a typical bistable element.

FIG. 4 represents the voltage-current characteristic of an active element that can assume either of two discrete stable states. Examples of such elements include (among others) neon lamps, gas filled tubes of all types, 4-layer PNPN switches, unijunction transistors, and silicon-controlled rectifiers. While unijunction transistors and silicon-controlled rectifiers are three-terminal devices, they may be utilized as two-terminal elements by maintaining one terminal at a constant potential.

These two-terminal devices can remain in either of two stable states, one of which represents a high electrical impedance, the other a relatively low impedance. Two such stables states are illustrated in FIG. 4 as points 1 and 2, respectively. Recognizing that the impedance is represented by the slope of the curve, it is evident that the region of point 1 represents a high impedance when compared to the region 2.

The transition of the operating point between the two stable states is achieved by varying the voltage across the device. To go from region 1 to 2 it is necessary to raise the voltage to $V_{bo}$, the breakover voltage. To shift the operating point from region 2 back to 1, the voltage must be reduced below $V_e$, the extinguishing or holding voltage. In view of this, it is logical to think of the element as a voltage-actuated switch which can be turned on and off by varying the voltage across its terminals.

Figure 5:
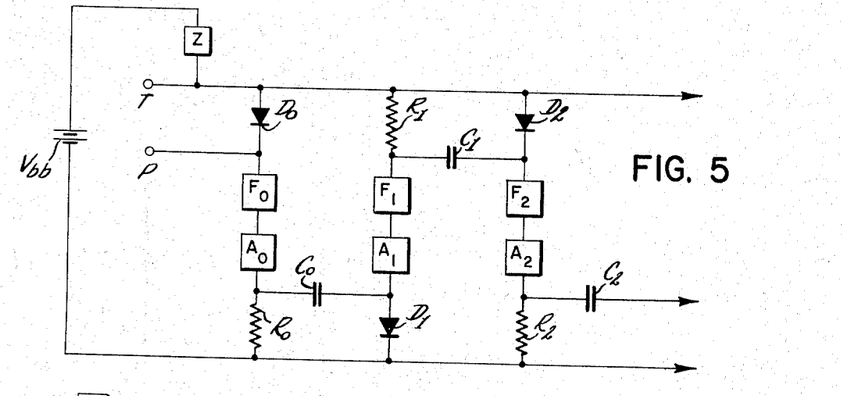
FIG. 5 is a simplified generalized schematic diagram of a counter circuit.

FIG. 5 illustrates a completely generalized schematic diagram of a counting circuit. The active bistable element is represented by a black box A. The functional element in the circuit is represented by F. All other circuit elements bear conventional schematic symbols. Element F could be any of a large number of devices including, but not limited to, neon and incandescent lamps, relays, solenoids, etc.

The purpose of discussing the most general representation of the counter is to show that its operation is not in any way restricted to the use of the neon lamp as the active element. It will be shown, however, that the neon lamp is particularly suited to use in the circuit because it can serve as both the active and the functional element at the same time.

For ease in discussion, it is necessary to impose the following conditions on the circuit parameters:

(a) The supply voltage $V_{bb}$ is greater than the element's breakover voltage $V_{bo}$.

(b) The impedance Z is chosen so that if any of the active elements $A_n$ is conducting, the voltage drop across Z makes the potential at T less than $V_{bo}$.

(c) The diodes $D_n$ have zero impedance Z in a forward direction and infiinite back impedance.

As a starting point or initial condition, assume that element $A_0$ is in its low impedance or conducting state. Conventional current then flows out of the positive terminal of $V_{bb}$ through Z, and through $D_0$, $F_0$, $A_0$, $R_0$ and back to the negative terminal of $V_{bb}$. The voltages at T, as imposed in (b), above, is now less than $V_{bo}$, making it impossible for any of the other elements $A_1$, $A_2$, $A_n$ to make the transition from its "1" state to its "2" state. This transition can only take place when the voltage passes through the $V_{bo}$ point. Since all of the A element networks are in parallel, the voltage across them is the same, and less than $V_{bo}$.

The current flowing through $R_0$ produces a voltage drop $V_{R0}$, across it that charges $C_0$ through the $R_0$, $C_0$, $D_1$ loop. The voltage across $C_0$ approaches $V_{R0}$ as a limit. It is evident that the current flowing through the functional element will activate the element and light the lamp, or close the relay, as the case may be.

By applying a negative signal of sufficient amplitude to T, the voltage at T is now reduced below the extinguishing level $V_e$, and the conducting element $A_0$ will switch back to its nonconducting state. The voltage across $C_0$, $V_{R0}$, will appear across $D_1$ and $-V_{R0}$ (with reference to ground as zero potential). Diode $D_1$ is in series with $A_1$, and the potential $V_{R0}$ also appears in series with $A_1$ and is series-aiding, i.e., adding a negative potential at the ground side of $A_1$, which is the same as adding a positive potential to the other terminal of $A_1$, either one reducing the voltage necessary to switch $A_1$ to its conducting state by $V_{R0}$.

If the voltage at T is now permitted to approach $V_{bb}$, when it reaches $V_{bo}$ $-V_{R1}$ (the potential necessary to switch $A_1$), $A_1$ will switch to its conducting state, and the voltage at T will again drop below $V_{bo}$, preventing any of the other elements from switching. When $A_1$ conducts, the current flows through the $A_1$ branch of the circuit energizing the functional element and producing the required commutating voltage across $R_1$. This voltage is series-aiding in the $A_2$ branch, and a negtaive pulse at T will transfer the count to said branch. The application of additional negative pulses to T will commutate the count to the $A_3$ branch and n pulses will transfer the count to the $A_n$ branch.

In order to close the loop (commutate the count back to the zero branch) at the end of 10 pulses, for example, some form of feedback signal is required. The feedback is supplied by connecting the commutating capacitor from the $A_{10}$ branch to point P.

The circuit arrangement just described has certain disadvantages which can be remedied by rearranging the circuit components. One disadvantage is that it can only be a closed loop for an even number of branches; a second is the difficulty of obtaining output signals from the branches. These output signals or pulses are useful in preset applications when an electrical signal is desired as the counter reaches a preset number. The difficulty in the circuit of FIG. 5 arises from the fact that the F elements do not have a common connection, ground, or otherwise.

Figure 6:
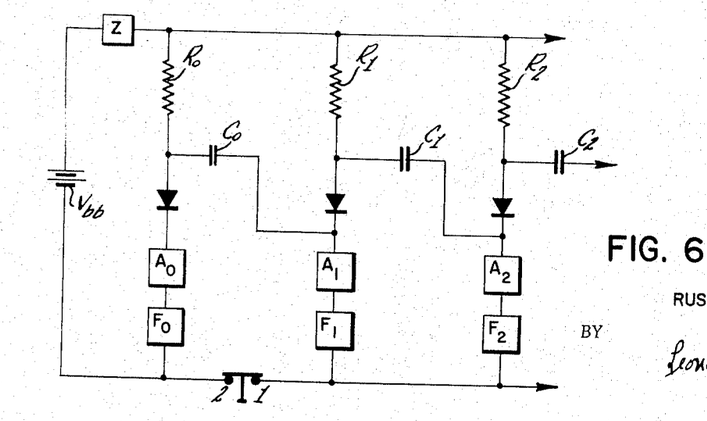
FIG. 6 is a rearrangement of the simplified schematic of FIG. 5.

The rearranged circuit is shown in FIG. 6. Study of this circuit shows that all of the disadvantages of FIG. 5 have been eliminated. The counter of FIG. 6 may count to any numerical system, to any base, i.e., binary, octal, decimal, quinary, etc. The functional elements all have a common connection at ground potential and if the resistors are used as these elements, signals may be taken from them in a preset application.

In order to be useful, the counter circuit must contain some simple reset circuitry or means of instantaneously resetting the counter to zero. The reset line must be connected to all the modules when they are connected together in a multidecade arrangement. If this capability is not provided, each module would require its own reset line, rendering the novel interconnection method used in the multimodule configuration impractical since an added pin would be required for each individual module's reset circuit.

The resetting is accomplished by opening the normally closed pushbutton switch connected between the points 1 and 2 of FIG. 6. This will impose the condition that none but circuit branch $A_0$ can conduct. Once the $A_0$ branch is conducting, the pushbutton can be released to its closed position without switching any other branch into conduction.

When several counter modules are connected to form a multidecade counter, all of the "1" terminals, of these modules, are connected to a common reset line running through all the counter modules to the power supply module where the normally closed pushbutton completes the ground return. Pushing the button will return all the decades to zero.

In some instances, it is desirable to have a purely electrical method of resetting the counters. This can be done by replacing the pushbutton with a relay. A simpler method is to use a normally conducting transistor to replace the pushbutton. Applying cutoff bias current to the transistor base will reset the counter as described more fully hereinafter.

There are two basic limitations on counting speed. One is the switching time of the active element, the other the time constant of the commutating network. The switching time of the active element is an inherent property of the particular element, and little can be done to alter it. In the neon lamp and other gas-filled tubes, the ionization and deionization times are the controlling factors. Although it is true that the ionization time may be reduced somewhat by application of excessive and/or fast rising voltages to the device, such techniques cannot be employed to much advantage in the counter circuit. Faster active elements can be used but their cost limits their present practicability when compared with the low-cost neon lamp. Some improvement in counting and reset response can be gained by shunting the interstate coupling capacitor with a resistor to shorten the time constant of the discharge loop.

Figure 7:
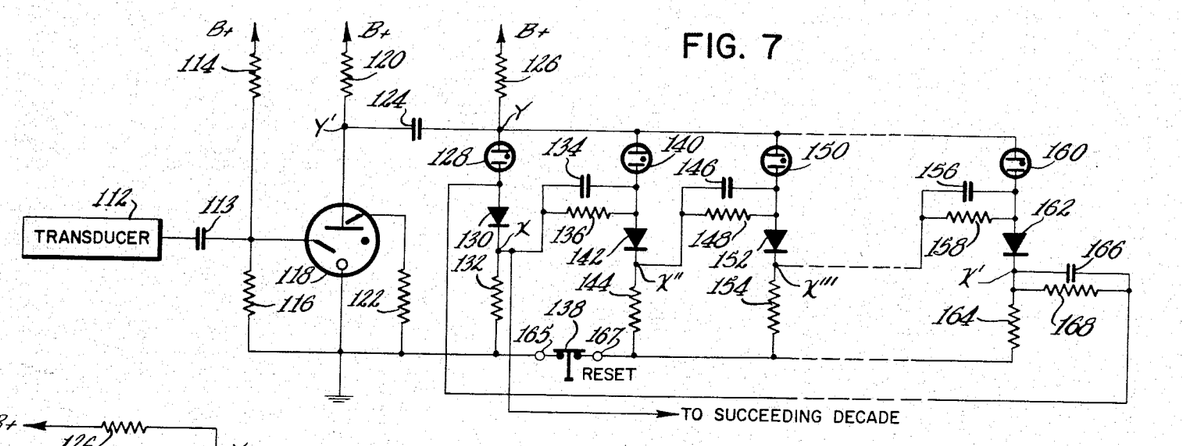
FIG. 7 is the basic schematic diagram of the present invention.

The basic circuitry of the present invention is illustrated in FIG. 7. For the sake of simplicity FIG. 7 shows only four neon lamps 128, 140, 150 and 160 which represent digits 0, 1, 2, and 9 respectively. The circuitry for the digits 3 through 8 (not shown) is identical with that for the other digits and is purposely omitted from FIG. 7.

Transducer 112 produces the pulse to be counted; this is applied through coupling capacitor 113 to the control electrode of thyratron pulse generator 118. Resistors 114 and 116 maintain the control electrode at the proper voltage to assure reliable firing of the thyratron 118. Resistor 120 is the anode resistor for the thyratron and resistor 122 connects the keep-alive electrode to ground.

In an actual operating model of the present invention, a positive B supply voltage of 210 volts is used to assure the availability of sufficient voltage to fire the type of neon lamp used, for example, a type NE–96 or NE–97 (as supplied by the General Electric Co.), which fires or ionizes about +160 volts. This does not preclude the use of different voltage levels to suit other types of active and functional elements. Voltage levels cited at various points in the circuit are typical of those actually measured and may differ in later models.

Neon lamps, in addition to serving as the bistable element in counter circuits, also serve as visual indicators. When the neon lamp is not conducting it is not illuminated. Conversely, when it fires or conducts or ionizes it glows, serving as a visual indication that it is conducting.

Referring to FIG. 7, assume, for the moment, that the digit 0 neon lamp 128 is conducting. Under this condition point X, at the junction of diode 130 and resistor 132, will be at about +40 volts and point Y, at the junction of neon lamp 128 and resistor 126, will be at about +100 volts, both with respect to circuit ground. In other words, there is a voltage drop of about 60 volts across conducting neon lamp 128. With point Y at the reduced level of +100 volts, none of the other neon lamps in the counter ring can fire. (A counter ring includes, in a decade, for example, all of the neon lamps from the 0 lamp through the 9 lamp.)

Neon lamp 128 (representing digit 0 in the decade) is extinguished and neon lamp 140 (representing digit 1) is turned on or made to conduct as follows: Upon application of the next succeeding pulse from the transducer, the pulse generator (not shown in FIG. 7) in the counter produces a positive pulse, firing thyratron 118. At the time thyratron 118 fires it becomes a low impedance, the current fed through capacitor 124 lowers the voltage at point Y to a level low enough to extinguish the 0 neon lamp 128. During the time neon lamp 128 has been conducting, capacitor 134 charges to a potential determined by the voltage drop across resistor 132. When neon lamp 128 ceased to conduct, most of the voltage across capacitor 134 appears across diode 130 adding about −40 volts to the ground side of neon lamp 140. When the thyratron 118 fired there was a negative pulse through capacitor 124 at point Y, turning off neon lamp 128. Capacitor 134 starts to charge from the +B supply, and when point Y reaches the required voltage, neon lamp 140 fires. The voltage required is the breakover voltage of +160 volts minus the 40 volts at the ground side of lamp 140 or a net voltage of 120 volts. When neon lamp 140 fires, the voltage at point Y is lowered to about 110 volts, causing a corresponding voltage drop at point Y', at the anode of thyratron 118, thus shutting off thyratron 118. Thus, the negative pulse produced by turning on any neon lamp shuts off the thyratron, making it ready to fire upon application of the next pulse from the transducer. Diodes 142 and 152, and resistors 144 and 154 perform the same circuit functions as diode 130 and resistor 132 but in the digit 1 and 2 positions, rather than in the digit 0 position.

The output of neon lamp 160, for digit 9, is fed back through capacitor 166 for the purpose of firing digit 0 neon lamp 128 when the applicable count transition from one counter ring to another takes place, for example, from the units ring or module to the tens ring or module. An output at point X, at the junction of diode 130 and resistor 132 is used for two purposes: to fire digit 1 neon lamp 140 in the circuit of FIG. 7 and to fire the thyratron 118 in the tens counter module.

To reset the counter to zero, i.e., to cause any neon lamp other than zero to extinguish, reset normally closed pushbutton switch 138 is opened. This action opens the ground return of all of the neon lamps except 128 which represents digit 0.

Figure 7A:
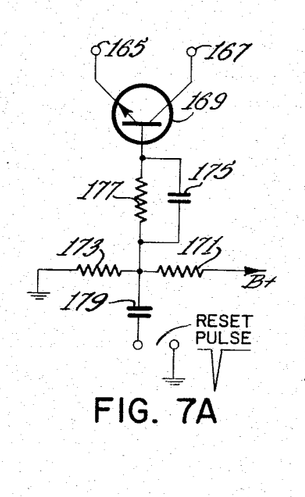
FIG. 7A is a schematic diagram of a reset circuit which may be used in connection with the circuit shown in FIG. 7.

A remotely operable arrangement is shown in FIG. 7A wherein transistor circuit is connected to terminals 165 and 167 of FIG. 7 in place of reset switch 138. Resistor 171 and resistor 172 form a voltage divider network connected between B+ and ground providing a bias voltage to keep transistor 169 in its "on" or conducting state. Resistor 177 serves to adjust to current through transistor 169 to obtain saturation. Capacitor 175 provides a low impedance circuit for a negative reset pulse generated by conventional circuits which may be as simple as a battery. Capacitor 179 is a conventional D.C. blocking capacitor. When a negative reset pulse is applied to transistor 169 it is placed in a non-conducting condition opening the ground return to all the lamps other than the "zero" lamp preventing further conduction.

Figure 8:
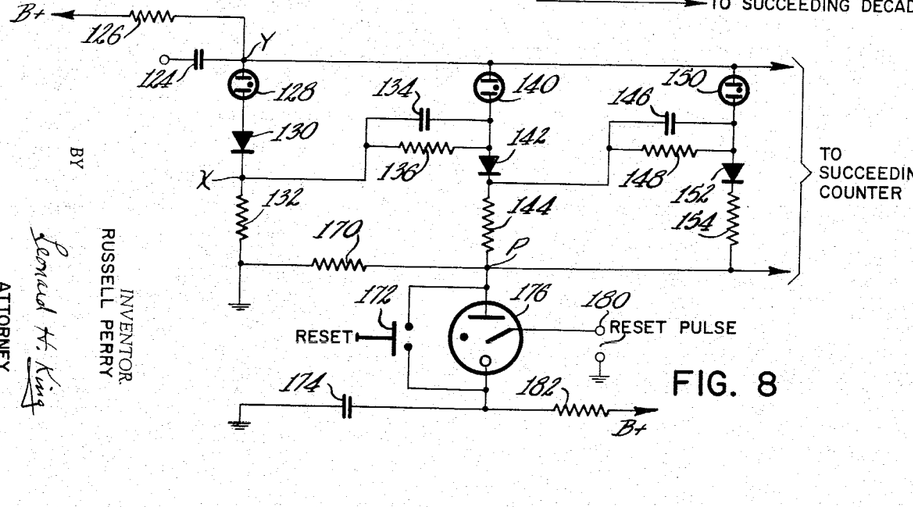
FIG. 8 is a simplified schematic diagram of the reset circuitry of the present invention.

FIG. 8 which shows another embodiment of the reset circuitry which enables the reset of the counter to be accomplished at a point remote from the panel of the counter where the pushbutton of the simple reset circuit of FIG. 7 is mounted. In the circuit of FIG. 8 the pushbutton 138 has been replaced by a resistor 170. Capacitor 174 is charged through resistor 182 from the +B supply. When it is desired to reset the counter, a positive polarity reset pulse is applied at reset terminal 180 to control grid of thyratron 176; alternatively, normally open switch 172 may be closed. Switch 172 may be a manual pushbutton or the contacts of a electromagnetic relay. Either action will reset the counter by causing the discharge of capacitor 174, thereby raising the voltage at point P (the return line for all the neon lamps except the digit 0 neon lamp) to such a level that there is insufficient voltage across the neon lamps (representing digit 1 through digit 9) to maintain conduction, whereupon any one of these neon lamps which was conducting will extinguish; this allows the voltage at point Y to rise towards the +B level whereupon neon lamp 128, representing digit 0, fires. With neon 128 conducting, the voltage at point Y is lowered far enough so that no other neon lamp in the counter ring will fire unless a subsequent counter input pulse is applied at input coupling capacitor 124.

At each of the points in FIG. 7, such as X, X', X", or X''', and at similar points at all the other neon lamps in the counter ring, a signal is available each time the applicable neon lamp conducts. Thus, it is possible to make a connection, for example, at point X''' to supply a signal to some device which it is desired to actuate. Then, each time the counter in the example reaches the count of 2 (corresponding to the firing of neon lamp 150) a positive pulse is applied to the external device being actuated. This feature is called a preset or the supplying of a preset signal. The present invention provides either single or multiple (not limited to 2) presets shown in simplified circuitry form in FIGS. 9 and 10. By way of example, a dual preset is shown in FIG. 10.

Figure 9:
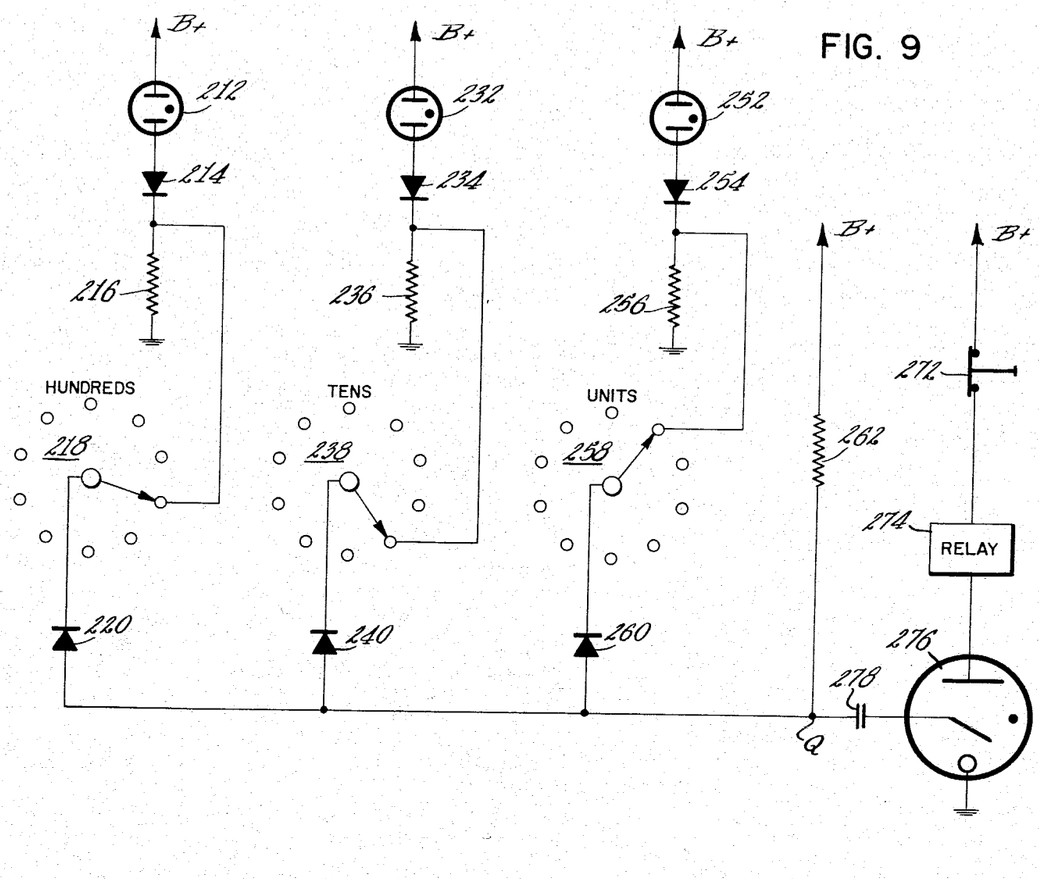
FIG. 9 is a simplified schematic diagram of a single preset counter module.
Figure 10:
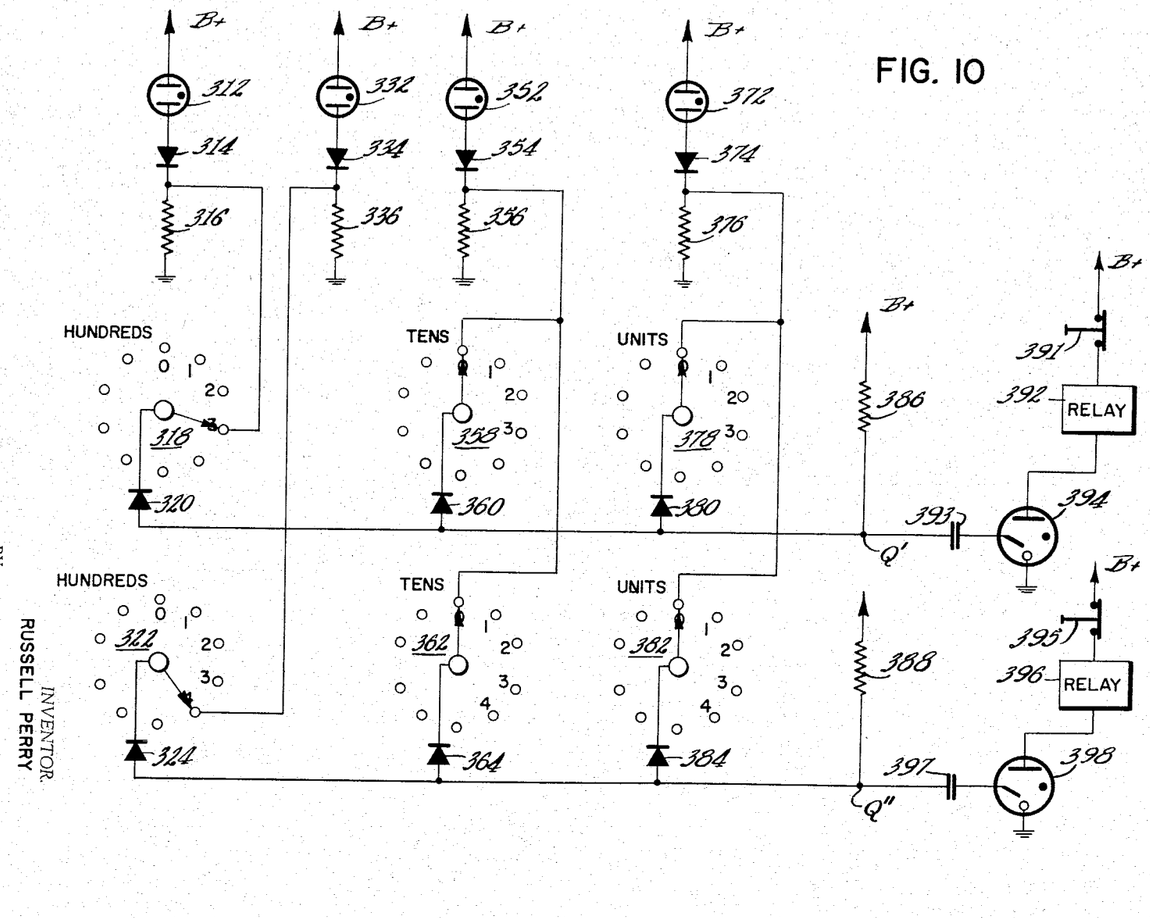
FIG. 10 is a simplified schematic diagram of a dual preset counter module.

FIG. 10 shows, in a simplified version, a three-stage counter having units, tens, and hundreds counters and single presets. Only the portion of the circuit essential for discussion is shown. In FIG. 9, the presets or preset switches 218, 238 and 258 are adjusted for a preset of 341, the connections at the switch points being made to the equivalent of points X of FIG. 7 or to the junction of diode 214 and resistor 216, for example, in the digit 3 neon lamp circuit in the hundreds counter. As before stated, at the start of conduction of any neon lamp in the counter, there is a positive pulse at point X for that neon lamp circuit.

In FIG. 9, the outputs from counters (300, 40 and 1) are combined through diodes 220, 240 and 260, respectively, in a circuit which is connected to +B through resistor 262. When neon lamps other than those representing the 300, 40 and 1 numbers are fired, the voltage at point Q will be very low (less than 2 volts in a typical counter using the +B voltage of 210 volts and circuit constants of the present invention). The relatively low voltage at point Q is determined by the ratio of resistances of resistors 262 and 216, for example, resistor 262 being about 150 times the value of resistor 216. When any one or two of the three neon lamps shown in FIG. 9 fire, the voltage at point Q will still remain at less than 2 volts. When all three of the neon lamps 212, 232 and 252 fire, i.e., when the counters in the example reach a count of 341, the voltage at point Q rises to about 40 volts, firing the thyratron's anode circuit. Relay 274 can actuate any desired device external to the counter. Relay 274, capacitor 278 and thyratron 276 are provided in the power supply module of the counter. The preset relay may be reset by opening the +B supply line to its thyratron; normally-closed pushbutton switch 272 is supplied for the purpose. Either a separate switch, such as 272, may be utilized in the reset operation, or the contacts breaking and making the +B supply to the thyratron 276 may be incorporated as additional contacts in the normal reset switch such as switch 138 in FIG. 7. In FIG. 9 diodes 234 and 254 and resistors 236 and 256 perform circuit functions similar to diode 214 and resistor 216 but in digit 4 and 1 positions rather than in position 3.

FIG. 10 illustrates in simplified form a three-state counter similar to that of FIG. 9, but having dual presets. In the dual preset version points X, X', X", etc., in each counter ring are connected to two 10-position switches, each of the corresponding switch points being in parallel. The arms of the switches 318, 358 and 378 of the first preset are connected to a common output line through their corresponding diodes 320, 360, and 380, and coupled through capacitor 393 to thyratron 394. Similarly, the arms of switches 322, 362 and 382 of the second preset are connected to a common output line through their corresponding diodes 324, 364, and 384 and coupled through capacitor 397 by thyratron 398. The dual preset feature is applicable, for example, in coil winding, where the first preset may slow the action, and the second could bring the action to a stop. In the example of FIG. 10, the first preset is adjusted at 300, while the second is set for 400. While only two presets are shown and discussed, the present invention is readily adapted for use with as many presets as may be required by the application at hand. In FIG. 10, neon lamps 312, 332, 352 and 372; diodes 314, 334, 354 and 374; resistors 316, 336, 356, and 376; resistors 386 and 388; relays 392 and 396; and pushbuttons 391 and 395, perform circuit functions similar to corresponding components in like circuit locations shown previously in this specification.

Counter modules of similar type are interchangeable, i.e., counter modules having no preset switches are interchangeable with others having no preset switches. Those having one preset switch are interchangeable with others having one preset switch, etc. In other words, it makes no difference which module in a multimodule or multidigit counter is utilized as the units module, for example. To assure operation at the higher counting rates and to improve reset response, resistors have been shunted across the inter-neon-lamp coupling capacitors to shorten their discharge time. Refer to FIG. 7 wherein resistors 136, 148, 158 and 168 are connected in parallel with coupling capacitors 134, 146, 156 and 166, respectively.

There are some applications where the name "counter" does not truly describe the function of the circuitry of the present invention. An example of this is a scale-of-three counter in which the functional elements are lamps illuminating green, yellow and red lenses, and the active elements are high-power PNPN switches. Such circuitry triggered by appropriate timing pulses could serve as a traffic light control having no moving parts. In such an application, the circuit does not count anything but acts more like a selector switch, applying voltage on command to several different loads.

Figure 11A:
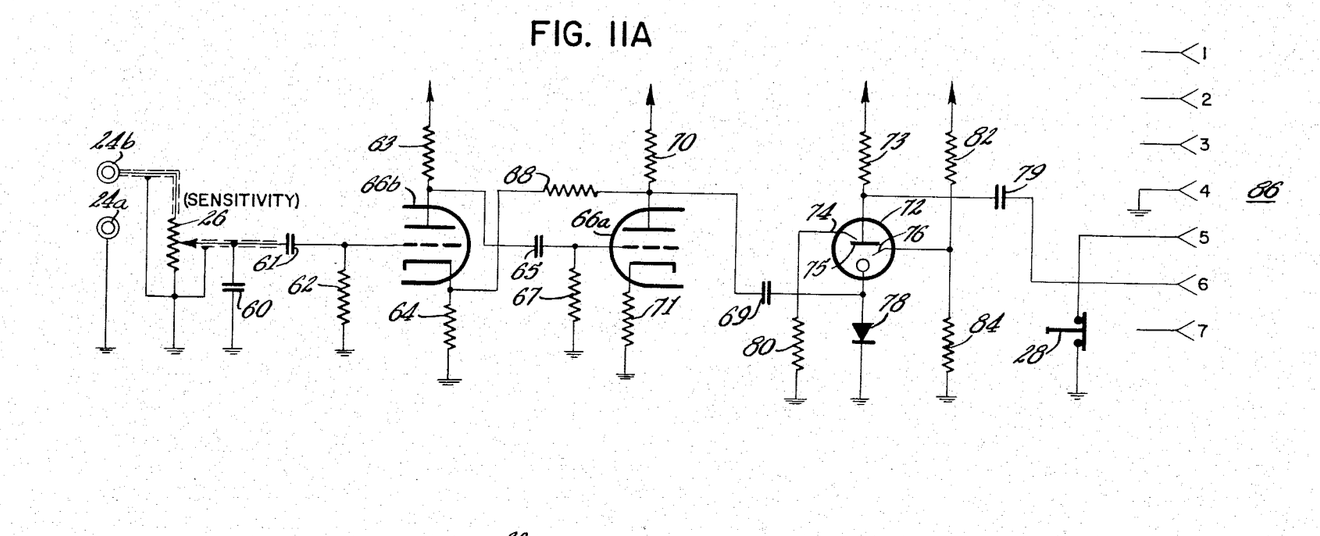
FIG. 11A is a schematic diagram of the unit's amplifier and pulse shaper in the power supply module.

The counting rate of the present invention is in excess of 1000 counts per second. Operation of the counter at a rate of 1000 counts per second requires that the first or units counter operate at this rate, the tens counting rate being only 100 counts per second in this case. To eliminate the possibility of marginal operation at high counting rates, the pulse or trigger generator for counting units comprises more sophisticated circuitry than that employed in the individual counter modules themselves. The units pulse generator is housed in the power supply module and its circuitry is shown in FIG. 11A. When a multimodule counter and power supply are assembled in a housing, the pulse generator in the units counter module (as thyratron 118 of FIG. 7, for example) is disabled and the pulse generator consists of dual triode electron tube 66a–66b and associated circuitry, together with thyratron 84.

The output or positive-going trigger or wavefront from the transducer is applied at binding posts 24a–24b, post 24a being the signal and chassis ground. The pulse to be counted should be of positive polarity and may be of any waveform having a duration of at least 50 microseconds. The input pulse is applied across sensitivity control means comprising variable resistor 26 which provides a means of adjusting the pulse amplitude to be applied to the grid of amplifier 66b. The pulse input may range from 0.1 volt to 100 volts.

Coupling capacitor 61 is of relatively large capacitance to improve the low-frequency response which is good to 10 cycles per second where a sine wave trigger input is utilized. Capacitor 60 bypasses spurious frequencies which may be present in sharp or fast-rising input pulses. Amplifier 66b employs a grid resistor 62 and a plate load resistor 63 of relatively large value to provide high amplification. Feedback is supplied through resistor 68 to amplifier 66b cathode. When the positive-going wavefront is applied to the grid of amplifier 66b, a large negative-going wavefront is produced at the amplifier plate. When a sine wave is applied to the amplifier grid, the resultant amplifier plate output is an inversion of the sine wave with the tops squared off; for other positive-going wavefronts the output at the amplifier plate is an amplified inversion of the input trigger. The output of the amplifier plate circuit is applied through relatively large coupling capacitor 65 (to maintain the low frequency response) to the grid of amplifier 66a which employs an unbypassed cathode resistor 71. The values of capacitor 65 and grid resistor 67 are chosen so that the output from amplifier 66b plate is differentiated, only the leading and trailing edges of the waveform being utilized by subsequent circuitry. The trigger output from the plate of amplifier 66a consists of inversions of the input triggers which are applied through coupling capacitor 69 to the cathode of trigger generator thyratron 72.

Trigger or pulse generator 72 is a cold-cathode thyratron having a keep-alive or ignitor 74 connected to ground through resistor 80. Ignitor 74 is spaced close anode 75 maintaining a small discharge thereto, reducing its ignition time. In the present invention, the grid or starter electrode of thyratron 72 is maintained at a positive voltage by voltage divider consisting of resistors 82 and 84 connected from +B to ground. When a positive polarity trigger is applied at the cathode of thyratron 72, diode 78 conducts the trigger to ground keeping capacitor 69 discharged. Thyratron 72 utilizes an anode resistor 73 of relatively large value and upon the application of a negative trigger at the cathode, thyratron 72 conducts producing a sharp negative trigger at its anode. Diode 78 discharges capacitor 69 at a rapid rate since no resistance is in the thyratron cathode circuit; the thyratron also discharging rapidly, thereby producing a fast falling negative trigger which is applied through coupling capacitor 79 to the ring counter of the units counter module. The value of capacitor 79 has been chosen so that any reflections at high counting rates in the counter module will not adversely affect the firing of thyratron 72. The trigger from thyratron 72 is applied directly to the units module input circuitry via connector 86, no outside or external wiring being required. Connector 86 also provides a means of furnishing +B voltages to the various counter modules.

Figure 11B:
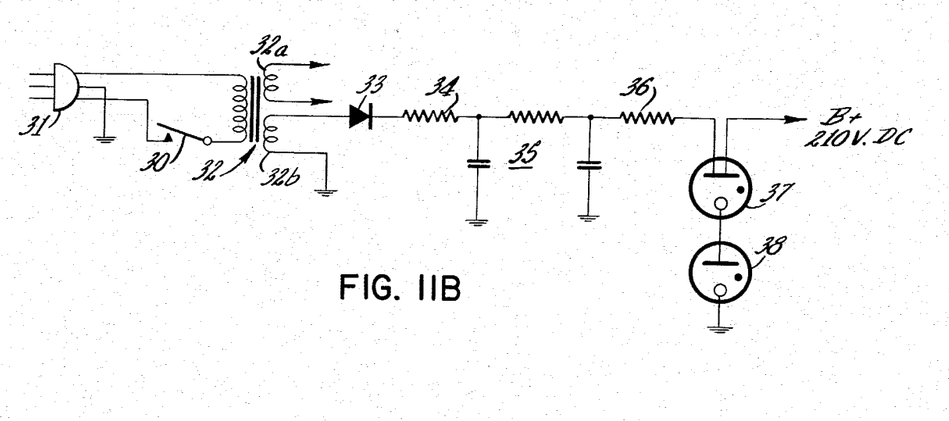
FIG. 11B is a schematic diagram of the power-supply module.

The circuitry of the power supply itself is conventional and is housed in the power supply module 20 (FIG. 1), the schematic diagram being illustrated in FIG. 11B. Three-pin power plug 31 provides connection to the standard grounded 115-volt A.C. power source and single-pole single-throw switch 30 provides a means for turning the counter on and off. One secondary winding 32a of transformer 32 supplies heater voltage for the pulse or input trigger amplifier 66b and pulse generator 66a, the other secondary 32b supplying the B voltage. Diode rectifier 33, surge current limiting resistor 34, and network 35 rectify and filter the A.C. voltage applied from transformer 32. Resistor 36 drops the D.C. voltage so that the proper current is maintained through series regulator gas tubes 37 and 38 which hold the output D.C. voltage within about ±2 volts of the nominal +210 volts.

There has been disclosed heretofore the best embodiments of the invention presently contemplated and it is to be understood that various changes and modifications may be made by those skilled in the art without departing from the spirit of the invention.

What is claimed is:

1. An electronic pulse counter, said counter comprising a series of individual gas conductive elements each of which has at least a first and second state of conduction, said element also visually indicating which of said states of conduction exist in each of said elements at any time; means for connecting all of said elements to a common source of electrical energy, said elements requiring specified potentials applied thereto to be driven from one state of conduction to another; means connected between said source of electrical energy and said elements to determine the potentials applied to said elements and prevent more than one of said elements from being driven into one of said first and second states of conduction at any time; an electrical charge accumulating member connected between each of said elements and the next adjacent element, the conduction through one of said elements in its first state of conduction serving to accumulate a charge on said charge accumulating member, the potential across said members increasing with the accumulation of a charge thereon, and means for connecting said charge accumulating means to said adjacent element to apply thereto the potential across said charge accumulating means to aid the potential from said source when one of said elements is driven from its first state of conduction to its second state of conduction to determine which of said elements is to be next driven into its first state of conduction; and switch means connected in a common connection of said elements between said elements and said source of electrical energy for interrupting the flow of energy from said source to all but one of said elements to reset said counter, wherein said switch means includes an electron flow control means, and means for applying to said electron flow control means an electrical signal for determining current flow in said electron flow control means and interrupting the current in the common connection.

2. The counter defined in claim 1 wherein said electron flow control means comprises a gas filled tube having a control electrode, an anode, and a cathode; a capacitor connected to a source of electrical potential and adapted to be charged thereby; means for connecting said capacitor to the anode of said gas filled tube; means for connecting the cathode of said gas filled tube to said common connection; and a resistor connected between one of said elements and said common connection; whereby an electrical signal applied to said control electrode causes said gas filled tube to conduct, effectively connecting said charged capacitor to said common connection to raise the potential thereof to a value above which said elements are in said first state of conduction, the resistor preventing such action from affecting said one element.

3. The counter defined in claim 1 wherein said electron flow controlling means comprises a multielectrode transistor, said transistor having one of its main conductive paths in series with said common connection, and means for applying an electrical signal to said transistor to terminate conduction therethrough and disconnect all but one of said elements from said source.

4. A counter module for counting incoming electrical pulses and for generating an output signal when a selected number of pulses have been counted, said module comprising a plurality of electrical elements which have a first and a second state of conduction, each of said elements being driven into said first state of conduction by the application thereacross of a potential having an amplitude greater than a first threshold value, each of said elements being driven into said second state of conduction by the reduction of the potential applied thereacross to less than a second threshold value, said plurality of elements equaling in number at least the number of the radix of the system in which the module is to count, a resistor, means for connecting all of said elements through said resistor to a common source of electrical energy, the value of said resistor being so selected that current flowing through said resistor due to a single element being in said first state of conduction decreases the potential applied from said source across the remaining elements to a value less than said first threshold potential; means for connecting a capacitor between each pair of adjacent elements, said capacitor being charged by the current flowing through one of said elements of said pair in said first state of conduction; means for applying to all of said elements an input pulse which reduces the potential applied thereto below said second threshold value to drive said elements into said second state of conduction, the charge on said charged capacitor applying to the other of said pair of adjacent elements a potential which is above said first threshold value to determine which of said elements is next driven into said first state of conduction; a load resistor in series with each of said elements; a selector switch having a plurality of first contacts; means for connecting one of said plurality of said first contacts to each of said load resistors, and second contacts settable to connect with any of said first contacts; means for deriving an electrical signal from said switch means when the element associated with the load resistor connected to the first contact which is connected to said second contact is driven into the first state of conduction; switch means comprising a normally conducting transiston in series with all of said elements but one and interposed between said elements and said source of electrical energy, said one element defining the first or zero count position of the counter; and means for applying to said transistor an electrical signal for terminating the conduction through said trasistor to interrupt the connection between all but one of said elements and said source.

5. The counter defined in claim 4 wherein said switch means comprises a normally nonconducting gas filled electron discharge device having a control electrode and a main conduction path, a capacitor connected to one side of said main conduction path and said common connection connected to the other side of said main conduction path, and means for applying an electrical signal to said control electrode to cause said device to conduct and to connect said capacitor to said common connection to lower the potential across the elements to drive all but one of the elements into said second state of conduction.

6. The counter defined in claim 5 further including normally open switch means connected across said gas filled discharge device, and means for manually operating said normally open switch means to short-circuit said discharge device to apply the potential of said capacitor to said common connection in opposition to the potential from said source.

7. The counter defined in claim 4 wherein said one element represents the first or zero count, means for connecting a capacitor between the last element in said plurality to said one element so that the application of a pulse to the counter when said last element is in said first state of conduction drives said last element into second state of conduction and said one element into said first state of conduction, and means for selectively connecting the load resistor associated with said one element to the one element of a second counter module, each of said counter modules representing a power of the radix of the count.

8. The counter defined in claim 7 further including means to connect said counter modules to a common source of electrical energy, and means interposed between said counter module and said source for simultaneously resetting all of said counter modules to zero.

References Cited
UNITED STATES PATENTS

| | | | |
|---|---|---|---|
| 2,619,282 | 11/1952 | Manley | 315—84.5 X |
| 2,714,180 | 7/1955 | Manley | 235—92 |
| 2,981,941 | 4/1961 | Ogle | 235—92 |

MAYNARD R. WILBUR, *Primary Examiner.*

DARYL W. COOK, *Examiner.*

G. J. MAIER, *Assistant Examiner.*